United States Patent [19]

Welker

[11] 4,442,999
[45] Apr. 17, 1984

[54] REINFORCED PLUG FOR FLOW REGULATORS

[75] Inventor: Robert H. Welker, Sugar Land, Tex.

[73] Assignee: Welker Engineering Company, Sugar Land, Tex.

[21] Appl. No.: 400,986

[22] Filed: Jul. 22, 1982

[51] Int. Cl.$^3$ .............................................. F16K 31/12
[52] U.S. Cl. ................................. 251/358; 251/63.5; 138/46
[58] Field of Search .................... 251/356, 358, 61.1, 251/63.5, 62, 63; 137/219; 138/46

[56] References Cited

U.S. PATENT DOCUMENTS

| 963,060 | 7/1910 | Noppel | 251/358 |
| 2,324,880 | 7/1943 | Rogers et al. | 251/358 |
| 3,118,649 | 1/1964 | Allen et al. | 251/358 |
| 3,241,806 | 3/1966 | Snell, Jr. | 251/358 |
| 3,746,300 | 7/1973 | Welker | 251/191 |
| 4,206,902 | 6/1980 | Barthel et al. | 251/57 |
| 4,351,510 | 9/1982 | Welker | 251/118 |
| 4,354,661 | 10/1982 | Welker | 251/118 |

Primary Examiner—A. Michael Chambers

[57] ABSTRACT

A reinforced expandable resilient plug for a flow regulator is disclosed, and the preferred and illustrated embodiment thereof incorporates a multiply wrap, each ply being independent of the other plies and coextensive with the outer surface of the plug to provide strength. Each ply is formed of lengthwise, nonyieldable fibers, and the several fibers which form a ply are collectively joined together into a sheath of yieldable, stretchable material. Each ply is, therefore, able to stretch in a dimension enabling the plug to expand while lengthwise elongation of each fiber prevents expansion in that dimension. This assists in maintaining the shape of the inner plug.

7 Claims, 3 Drawing Figures

REINFORCED PLUG FOR FLOW REGULATORS

BACKGROUND OF THE DISCLOSURE

In flow regulators, an expandable, resilient inner plug swells or expands within a closed housing to constrict the flow of a fluid past the regulator. Ordinarily, the fluid is natural gas. The resilient inner plug is normally expanded to constrict flow, the expansion being accomplished by squeezing the two ends of a resilient plug with a hydraulic control system, whereupon the resilient plug is shortened in length, swells in diameter and constricts the annular flow space on the interior of a metal housing. The inner plug is exposed to damage by particle impingement from the flowing gas. It is also subject to damage by taking a compression set. This is accomplished dependent on a number of scale factors and is cumulative with time. Such plugs are constructed of more or less uniform diameter along the length of the plug. Nevertheless, damage is not uniformly distributed. At first blush, one would imagine that compression set, in the plug, is maximum at the center of the plug and reduced at the ends. The flowing gas seems to move the bulge accomplished on permanent compression set towards the downstream end. Usually a permanent compression set bulge damages the inner plug at the point of maximum bulge protrusion where a minimum radius occurs, and plug failure is normally manifested by breaking of pieces of the plug at this stress intensified region. Typically it will occur around the plug but its lengthwise location is normally found at the minimum radius, maximum bulge location defied above.

Reinforcing materials have been placed heretofore in resilient plugs. However, the reinforcing which is taught in this disclosure is believed to provide a new, useful and unobvious construction. It is a plug construction characterized by end caps which lap over the end of the plug to provide metallic and hence stable support and dimensional control. So to speak, the plug cannot bend, flex or bulge in that region. The end caps cooperate with multiple plies of reinforcing material near the outer surface. The reinforcing must be within the body to lend its strength to the body. If it is too deep within the body, the layer on the exterior will readily peal away. The reinforcing is preferably located just below the surface. Equally important, the reinforcing ply is formed of lengthwise fibers which do not elongate. They are molded into the body and, therefore, do not stretch, providing strength to the body. The fibers are folded under at the ends. This positions them in a bonded relationship beneath the end caps and held to the body by bonding. Moreover, the fibers, while stretching in the lateral dimension, do not elongate and control the bulging of the resilient body and prevent the formation of a damaging bulge. The reinforced fibers found in multiple plies protect the regions of stress concentration and compression set, thereby extending the life of the plug. The life can be extended quite successfully with the incorporation of two plies. While an additional number can be added, two plies are believed to be the optimum result. They provide sufficient strength to the plug. Three or more plies are permissible but there is a point of diminishing returns, and also they tend to, depending on the hardness of the rubber and the gauge of the fibers in the plies, strengthen the plug to the point of hardness wherein there is too little resiliency and excessive hydraulic pressures are required to operate the plug.

With the foregoing in view, this disclosure is summarized as a resilient plug construction incorporating reinforcing plies. The reinforcing plies are constructed of fibers which are nonyieldable in one dimension and the fibers are placed so that the length of the fibers protects against bulging. The fibers in a ply are joined in a resilient sheath, and the ply is able to stretch in the transverse dimension. The fibers which collectively form each ply are, therefore, able to expand as the diameter increases during compression. The inner valve is also constructed with stress rings at the end, the stress rings comprising end plates bonded to the resilient plug or body and having concentric, overlapping rings at the ends to thereby clamp the rings to the body. The threads which form the ply are lapped under at the stress rings.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
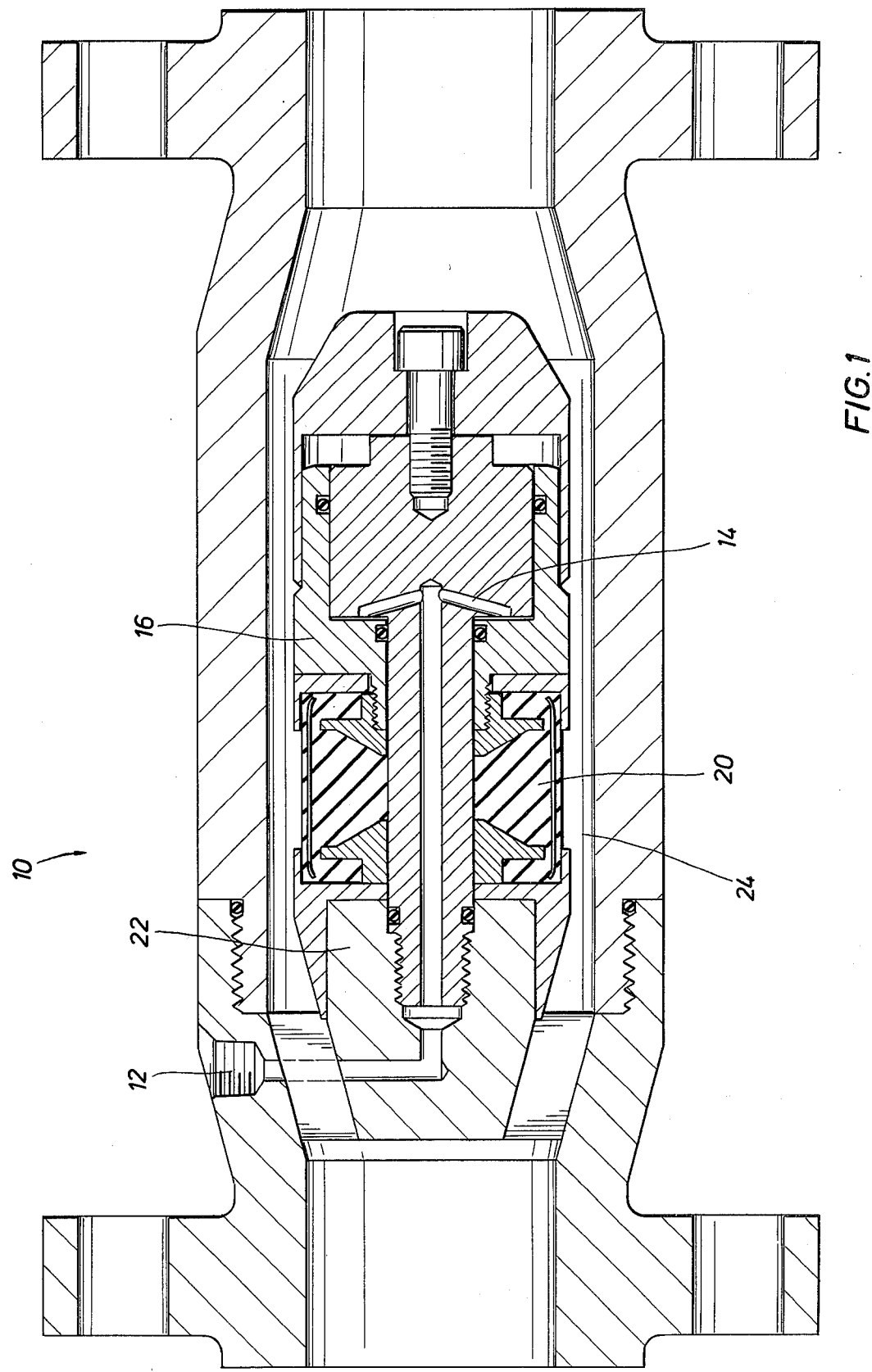
FIG. 1 is a sectional view through an expandable inner valve construction in a flow regulator incorporating an improved inner valve constructed as taught by the present disclosure.

Attention is first directed to FIG. 1 of the drawings which depicts a flow regulator 10. The flow regulator 10 is adapted to be installed in a fluid flow line such as a natural gas line. Hydraulic pressure is applied through a fitting 12 to expand in a chamber 14 to open, thereby moving the cylinder sleeve 16 to the left as viewed in FIG. 1, squeezing the resilient inner valve 20. The inner valve 20 is fabricated as a resilient rubber plug of generally cylindrical construction. As the sliding cylinder sleeve 16 moves to the left, the resilient plug is captured between that movable member and a fixed support body 22 and is squeezed. This forces the inner valve to swell or expand and it thereby constricts flow in the annular space 24 on the exterior of the plug. Flow regulation is accomplished in this space.

There are various styles of construction of flow regulators. In general, they disclose a resilient plug which is captured between a pair of metal plates, and one of the metal plates is moved towards the other metal plate. As they are moved, stress concentration is built up in the resilient plug and the plug eventually does fatigue or take a compression set.

Figure 2:
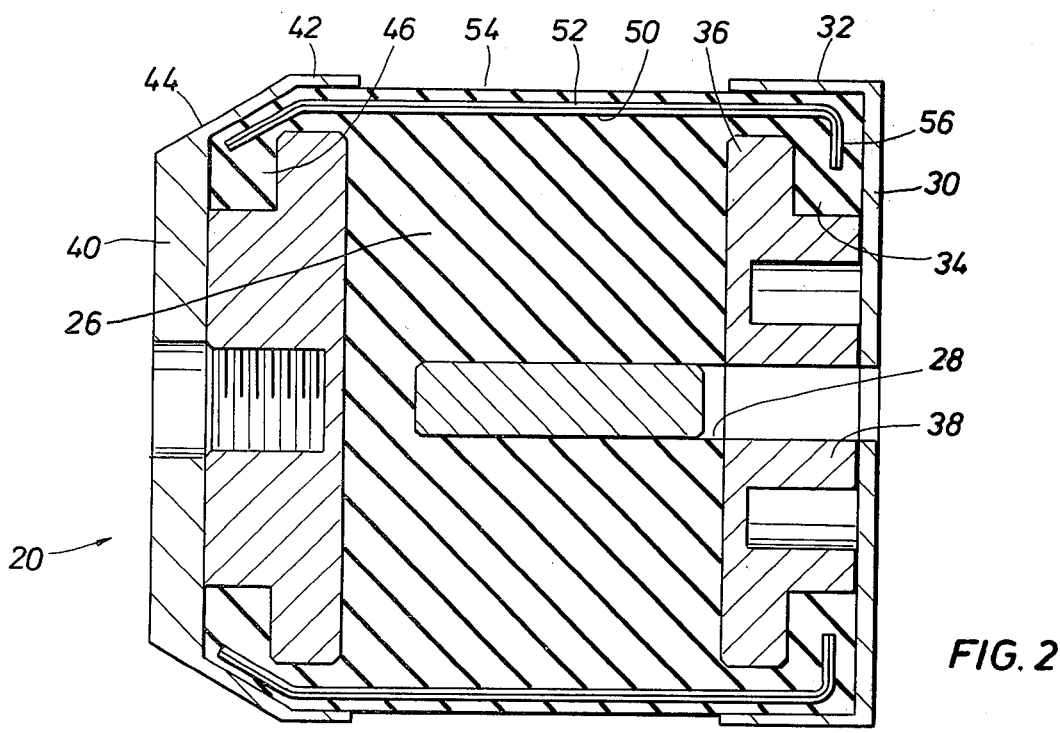
FIG. 2 is a sectional view through an inner valve showing reinforcing plies in accordance with this disclosure.

While the details of construction of the flow regulator may vary, the flow regulator normally incorporates the expendable inner valve which is shown in FIG. 2. This enlarged view depicts a typical inner valve in sectional view including the stress rings. The inner valve in FIG. 2 includes a cylindrical resilient body 26. It is axially drilled at 28 for installation purposes. The inner valve 20 incorporates a right hand end plate 30 having an overhanging lip 32. The plate 30 comprises a transverse plate which abuts against hydrulically moved compression apparatus as depicted in FIG. 1. The plate 30 functions as a cap over the end of the resilient body. Moreover, the peripheral lip 32 overhangs and extends onto the outer cylindrical face, this assuring that the resilient plug is not expanded at the very end. Radial expansion outwardly is prevented by the overhanging lip 32. It the lip were not included, expansion would occur at the edge of the plate 30 and break the bond of the resilient plug from the end located cap 30. This would lead to premature failure in that region, typically evidenced by breaking away of small pieces at the very edge of the plate 30. The lip 32 is termed a stress ring, focusing on its ability to control stress in the region beneath the ring.

The resilient body 26 has an overhang portion at 34. So to speak, it is undercut and overhangs the lip 36 on an end located reinforcing plate 38. The plate 38 is cast into the body, the integral consturction being accomplished at the time of manufacture.

Cooperation between the peripheral lip 32 (a stress ring on the exterior which directs the location of stress in the resilient body 26) and the protruding lip 36 on the interior collectively serves as a lock. They are a lock in the sense that the resilient material integrally cast and bonded to the two metal parts is locked into place. It is locked and, therefore, forms a single or contiguous structure. The resilient material is not only bonded, it is mechanically locked and, therefore, is more secure and the risk of pulling free, tearing or rupture of the metal-rubber bond is minimized.

The resilient body 26 is similarly constructed on the left as on the right. On the left, there is a slight structural difference for purposes of streamlining. The plate 30 is similar to a parallel plate 40 at the opposite end. The plate 40 supports an overhanging peripheral lip 42. However, it is truncated at 44. This is a streamlining step to provide a plug which is somewhat streamlined for gas flow. This streamlining arrangement is desirable in the fluid flow. The plug can be constructed where it is cylindrical so that the left hand plate 40 is similar or identical to the plate 30, and the encircling stress ring 42 is identical to the stress ring 32. That type of construction is permissible also. Streamlining to improve the laminar flow of the fluid is accomplished by modification of the upstream cowling on the structure associated with the flow regulator, one such arrangement being shown in FIG. 1. There, the upstream end is tapered to avoid abrupt constructions which create turbulence in the flow regulator area. In like manner, the downstream end of the flow regulator is tapered so that the flow of gas, as it leaves the regulator, is also streamlined and preferably laminar. Whatever the case, FIG. 2 depicts slight differences between the two ends, one accomodating a tapered region for streamlining purposes.

The left hand construction is identical in that it incorporates an undercut lip 46 which again locks with the stress ring in the same fashion as described hereinbefore. The stress rings thus protect the inner valve body and add strength to it. Morevoer, they typically shorten the stroke required to achieve a desired expansion.

MULTI-PLY CONSTRUCTION

FIG. 2 further discloses reinforcing plies. The numeral 50 identifies the inside ply and the numeral 52 identifies a parallel outer ply. The outer ply 52 is just below the outer surface 54. The surface 54 is the surface exposed to the surrounding housing as exemplified in FIG. 1. Failures are manifested at the surface 54. Typical modes of failure include the breaking away of small chunks or plugs of rubber at areas of maximum bulge and minimal radius of curvature. Further, the consturction with two plies cooperates with the stress rings 32 and 42 by tucking the plies under. For instance, at the left hand end, the stress ring 42 is truncated into two portions. The fibers which form the two plies are folded under. They are approximately parallel to the two ring portions. They fold under and, therefore, maintain an angel approximately equal to that of the truncated face 44. If desired, they can be extended to the end face plate 40, and folded under parallel to it. In similar fashion, the fibers which form the two plies are folded under at 56. There, they are folded radially inwardly. They are folded in this fashion and grip the resilient body at the time of fabrication, and are, therefore, bonded in the resilient body.

The outer ply is located just below the outer surface 54. The spacing is such that the ply is not exposed. The drawing depicts the outer surface as comprising a separate layer as though it were an afterthought. In actuality, it is preferable that the integral construction technique described above positions the outer ply at a spaced distance of perhaps a few millimeters below the surface, and relying on the integral casting technique used in fabrication, the apparent outer layer is, in fact, integral with the other components.

It is important that the plies be spaced and located so that they can stretch in the lateral dimension free of one another. Because they have different radiuses, they will be required to stretch by different amounts.

Figure 3:
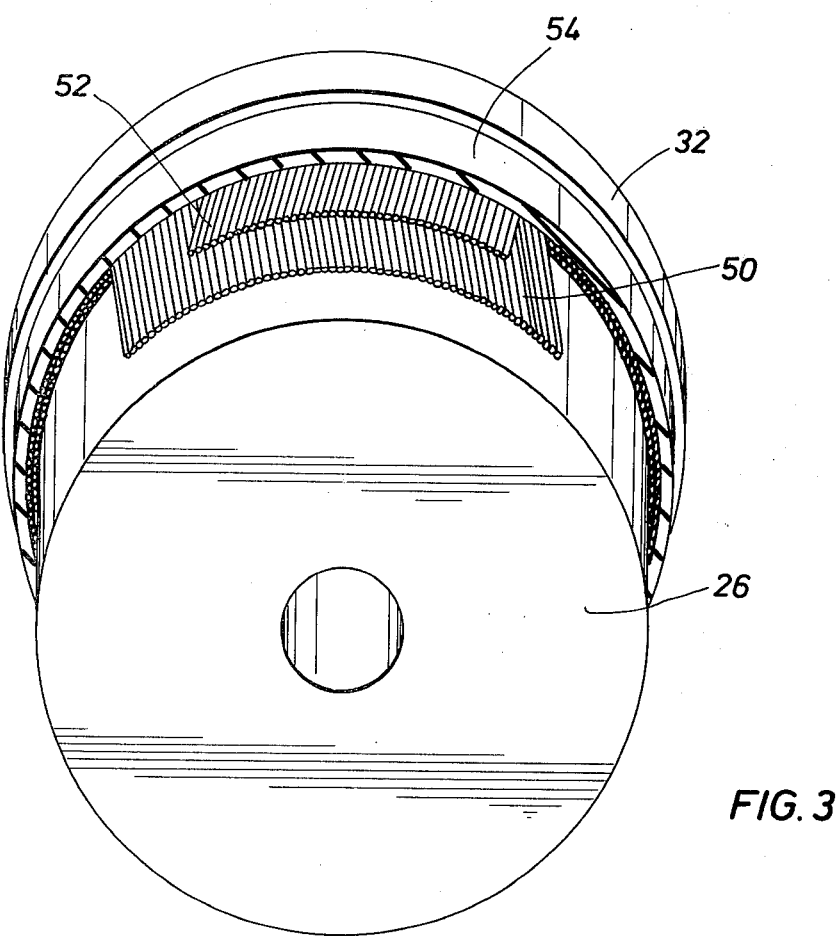
FIG. 3 is a pespective view of the inner valve of this disclosure showing the outer layer of resilient material pealed away and additionally depicting two plies of reinforcing material to increase the strength of the inner valve and to also spread the bulge, eliminating compression set and erosion.

The spacing of the plies and the construction of the inner plug is better understood in the view of FIG. 3. There, the stress ring 32 is shown with the other layers of the equipment cut away for sake of clarity. The outer face 54 is also shown. The outer ply 52 is a set of lengthwise fibers or threads. They are preferably nonextensible in this dimension. They are, however, joined to one another to form a single ply which is stretchable in the transverse dimension. Collectively, the outer ply resembles a type of sock or sleeve. The fibers are chosen to prevent extension in the lengthwise dimension, but the fibers are joined together as a sleeve and the sleeve is able to expand. One mode of obtaining this construction is achieved through the use of strong reinforced fibers which are parallel to one another and which are joined to a backing sheet of resilient rubber like material. The inner ply 50 is identical to the outer ply 52, the two differing in location. The inner ply is a sleeve of slightly smaller diameter. In other particulars, they are identical in construction, fabrication and differ only in position and only slightly in dimension.

Consider the apparatus in operation. Focusing primarily on FIG. 3, the resilient plug 26 swells or expands as axial loading is applied to it. The swelling is accommodated because the fibers in a given ply do not have yield around the circumference of the plug 26. Expansion is permitted. However, the lenthwise fibers in the plug prevent distorting accomplished by a compression set bulge of a tight radius. So to speak, the fibers in the two plies permit arcuate bulging only when there is relative compression of the plug. When the plug returns to its relaxed state, the fibers assist in restoring the plug to its original dimension.

The two plies have the form of a sleeve before integration with the plug. The sleeve like construction is accomplished along the full length of the resilient body 26. At the ends, the fibers are folded over. If desired, the resilient material which comprises the sheet of stretch material supporting each ply may be cut lengthwise at the ends, as for example, by cutting between the various threads that make up each folded under portion. The fibers are folded over at the time of fabrication so they are tucked under as shown in FIG. 2. This arrangement enables the fibers to grip and be anchored by the stress rings.

The plies are preferably formed of fibers which are relatively fixed in length. Their elongation is in the range of perhaps 3% or 4%. This contrasts with nylon threads which typically have an elongation of about 20%. In the transverse dimension, the flexure of the sheet comprising each ply is perhaps 25% or 30%. The individual fibers which comprise each ply preferably have a yield strength of perhaps two pounds up to about twenty pounds depending on scale factors. In light of the fact that many fibers are included in a ply, the relative strength of each ply is quite notable. The thread count ranges from about four threads per inch width upwards to about thirty-two threads per inch. Again, this is a scale factor and depends on the spacing between threads, the size of the threads, and the relative packing required. The threads are preferably formed into a sheet to thereby support and define each ply.

While the foregoing is directed to the preferred embodiment, the scope is determined by the claims which follow.

What is claimed is:

1. For use in a flow regulator having a resilient plug, a resilient plug construction which comprises a generally cylindrical, elongate body of resilient material adapted to be compressed between the ends thereof to expand radially outwardly to accomplish regulation in a flow regulator, and at least one ply of reinforcing material in said plug having a plurality of lengthwise fibers extending along the length of the plug wherein the fibers are anchored at opposite ends of the fibers by folding the fibers under into the body of the resilient plug, and further including means securing said fibers into a ply which is relatively nonyielding in a lengthwise dimension and which is yieldable to enable radial outward expansion of the plug during regulating.

2. The apparatus of claim 1 wherein said fibers are substantially nonyielding in their length and are folded under radially inwardly within said plug, and said plug includes end located peripheral external rings adjacent to the folded under ends of said fibers.

3. The apparatus of claim 2 including two plies concentric of one another and arranged with ends of both of said plies in parallel and folded under in like fashion to one another.

4. The apparatus of claim 3 wherein the two plies are concentric and parallel and are formed on lengthwise fibers in said resilient plug.

5. The apparatus of claim 4 wherein said plug is constructed at one end with a transverse bonded end plate supporting an external ring on the exterior, and there is a parallel plate cast in said plug body defining a locking lip in said body of resilient material and said plies are folded in to said lip and turn radially inwardly of said plug body.

6. The apparatus of claim 5 including similar end plates on said plug body at two ends thereof.

7. The apparatus of claim 5 including a truncated end plate and stress ring construction at one end of said plug body to define a streamlined plug to improve laminar flow by the flow regulator.

* * * * *